United States Patent
Pippin

(10) Patent No.: US 7,481,728 B2
(45) Date of Patent: Jan. 27, 2009

(54) SYSTEM AND APPARATUS FOR DRIVING A TRACK MOUNTED ROBOT

(75) Inventor: James M. Pippin, Keller, TX (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 687 days.

(21) Appl. No.: 10/879,298

(22) Filed: Jun. 29, 2004

(65) Prior Publication Data

US 2005/0288140 A1  Dec. 29, 2005

(51) Int. Cl.
*F16H 7/00* (2006.01)

(52) U.S. Cl. ............ 474/148; 474/166; 901/7; 901/8; 198/838

(58) Field of Classification Search ......... 474/148, 474/69, 70; 104/202, 226, 229, 230, 165, 104/167; 305/184, 195, 197, 199, 33; 414/154; 49/360

See application file for complete search history.

(56) References Cited

U.S. PATENT DOCUMENTS

| | | | | |
|---|---|---|---|---|
| 1,985,766 A * | 12/1934 | Dahms et al. | ............ | 105/101 |
| 4,318,242 A * | 3/1982 | Pin-Houng | ............ | 446/178 |
| 4,481,005 A * | 11/1984 | Mann, Jr. | ............ | 474/139 |
| 4,733,617 A * | 3/1988 | Boeniger | ............ | 105/29.2 |
| 4,744,454 A | 5/1988 | Polling | ............ | 198/365 |
| 5,018,928 A | 5/1991 | Hartlepp | ............ | 414/339 |
| 5,027,712 A * | 7/1991 | Wallick | ............ | 104/94 |
| 5,103,738 A * | 4/1992 | Claussen | ............ | 104/204 |
| 5,433,311 A | 7/1995 | Bonnet | ............ | 198/370.04 |
| 5,501,313 A | 3/1996 | Bonnet | ............ | 198/370.09 |
| 5,517,923 A * | 5/1996 | Cathiard | ............ | 104/173.1 |
| 5,528,121 A | 6/1996 | Okamura | ............ | 320/1 |
| 5,532,572 A | 7/1996 | Okamura | ............ | 320/1 |
| 5,604,426 A | 2/1997 | Okamura et al. | ............ | 323/282 |
| 5,632,589 A | 5/1997 | Bray et al. | ............ | 414/339 |
| 5,664,660 A | 9/1997 | Prydtz et al. | ............ | 198/370.04 |
| 5,746,565 A * | 5/1998 | Tepolt | ............ | 414/744.5 |
| 5,783,928 A | 7/1998 | Okamura | ............ | 320/122 |
| 6,230,873 B1 | 5/2001 | Graefer et al. | ............ | 198/370.04 |
| 6,265,851 B1 | 7/2001 | Brien et al. | ............ | 320/162 |
| 6,323,452 B1 | 11/2001 | Bonnet | ............ | 209/583 |
| 6,357,094 B1 * | 3/2002 | Sugimoto | ............ | 29/27 C |
| 6,424,156 B1 | 7/2002 | Okamura | ............ | 324/426 |
| 6,429,016 B1 | 8/2002 | McNeil | ............ | 436/47 |
| 6,530,619 B2 * | 3/2003 | Fukumoto et al. | ............ | 296/155 |
| 6,557,476 B2 | 5/2003 | Batisse | ............ | 104/289 |
| 6,691,001 B2 * | 2/2004 | Ostwald et al. | ............ | 700/245 |
| 6,762,382 B1 * | 7/2004 | Danelski | ............ | 209/583 |
| 7,182,557 B2 * | 2/2007 | Fenton | ............ | 409/132 |
| 2003/0019721 A1 * | 1/2003 | Greve | ............ | 198/459.8 |
| 2003/0226740 A1 * | 12/2003 | Soldavini et al. | ............ | 198/618 |
| 2004/0022298 A1 * | 2/2004 | Gunawardena et al. | ............ | 374/141 |
| 2004/0172884 A1 * | 9/2004 | Engelgau et al. | ............ | 49/360 |
| 2005/0224293 A1 * | 10/2005 | Molnar et al. | ............ | 187/200 |

* cited by examiner

*Primary Examiner*—Robert A Siconolfi
*Assistant Examiner*—Thomas W Irvin

(57) ABSTRACT

A drive system for a robot includes a track including opposed sidewalls, an electrified rail positioned between the sidewalls, a shoe mounted on the robot for contacting the electrified rail providing power to the robot, a drive motor mounted on the robot, a rotating drive member, the drive member engaging the track to drive the robot when the drive motor is actuated, means for coupling the drive member to the drive motor and means for increasing the friction between the drive system and the track at selected locations along the track.

12 Claims, 8 Drawing Sheets

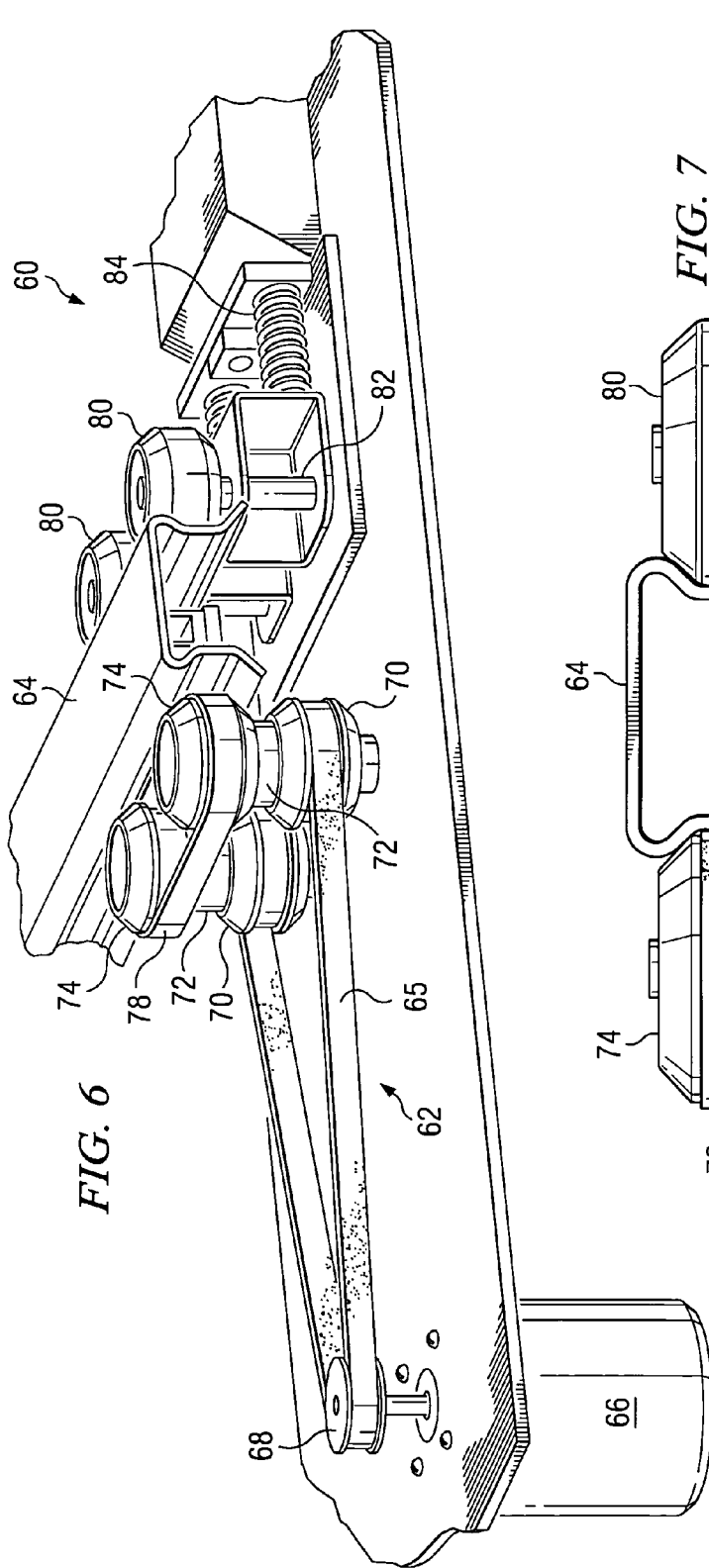
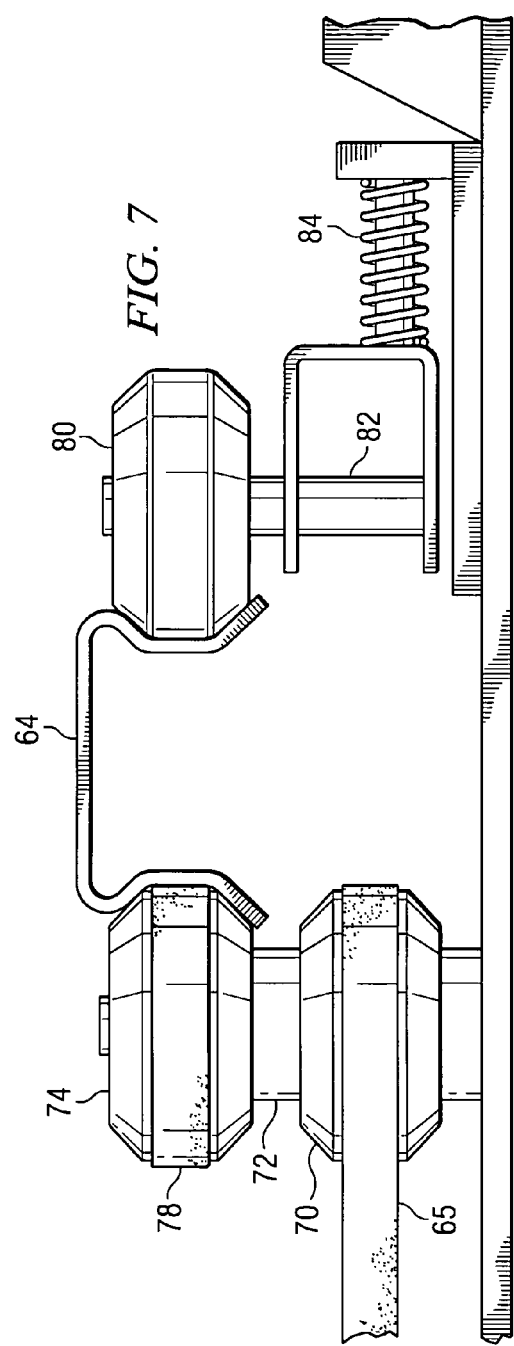
FIG. 6
FIG. 7

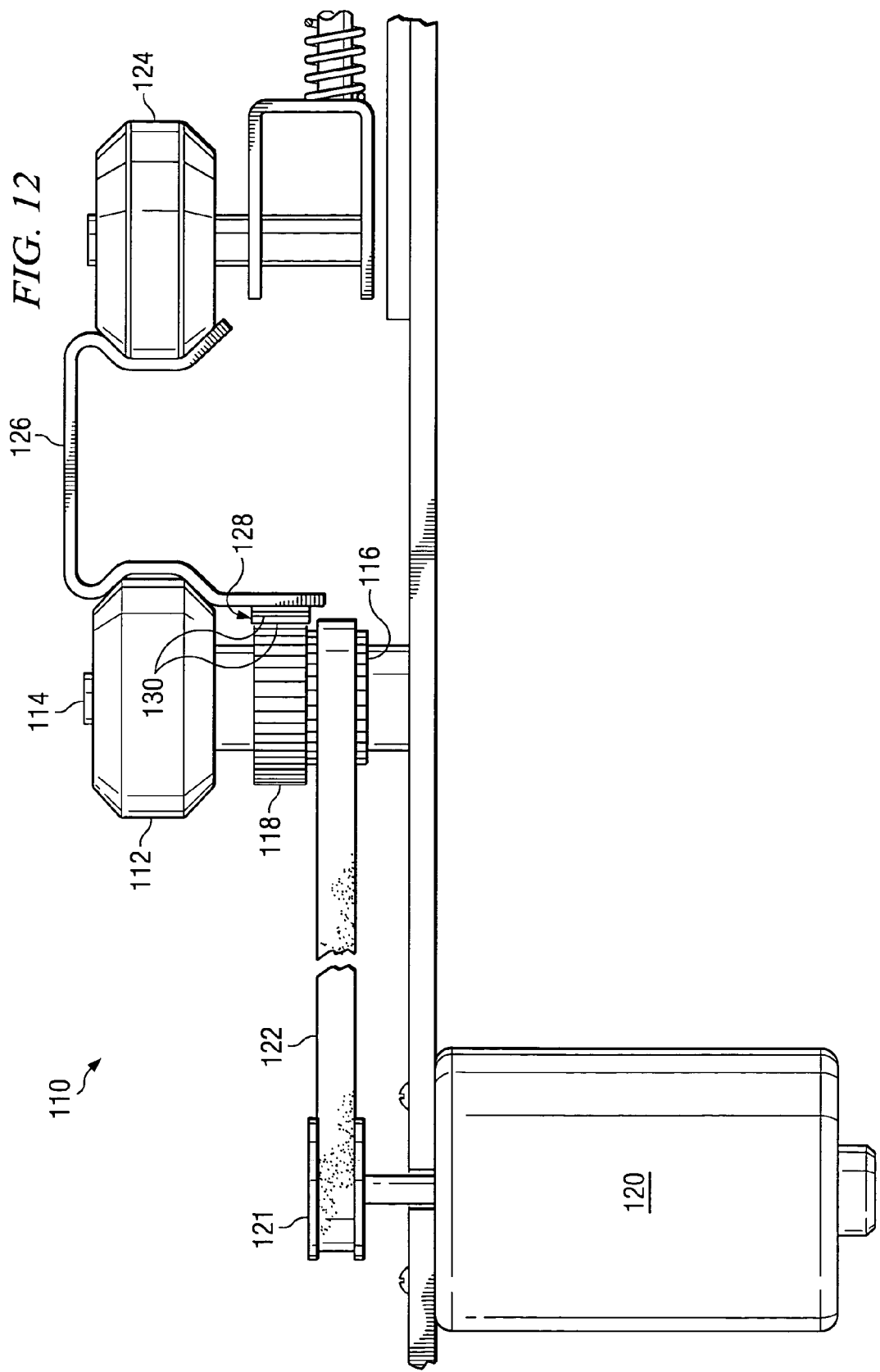

United States Patent

SYSTEM AND APPARATUS FOR DRIVING A TRACK MOUNTED ROBOT

TECHNICAL FIELD

The invention relates to track mounted trolleys such as delivery robots and in particular to an electrically powered, belt-type drive for a track mounted delivery robot.

BACKGROUND OF THE INVENTION

Track mounted trolley systems are employed in a wide variety of applications including automated sorting and delivery systems in which delivery robots are utilized to receive and sort items to a variety of locations. One such system employing a plurality of track mounted robots in a sorting and delivery system is described in commonly assigned U.S. patent application Ser. No. 10/142,348 for an Apparatus and Method for Mail Sorting, filed Feb. 27, 2003, the disclosure which is incorporated herein by reference for all purposes. Various means of driving such track mounted units are known, including chain drives, belt drives and friction type traction drives where a wheel or pulley is rotated against the track to drive the unit. In many cases, these drive systems suffer from a number of drawbacks including excessive noise, inability to precisely position the trolley for loading or unloading, and excessive component wear. These drawbacks tend to be compounded when the unit being driven is heavy, requiring more force to accelerate, decelerate and precisely position the unit. The invention described herein addresses these shortcomings.

SUMMARY OF THE INVENTION

In accordance with the invention, a drive unit for a track mounted delivery robot includes a drive motor mounted on the robot coupled to at least one drive wheel through a motor pulley and a resilient drive belt formed from a relative soft material so as to have a high coefficient of friction. The drive wheel is positioned to engage the track to drive the robot and configured to match the profile of the track. The drive wheel and resilient belt are configured such that the belt does not substantially engage the track as the drive wheel engages the track to drive the robot. As used herein, the phrase "does not substantially engage" means that the belt does not normally contact the track, however, it does not exclude incidental contact resulting from variations in clearances and manufacturing tolerances. In order to facilitate rapid acceleration, deceleration and precise positioning of the robot, one or more track extensions are mounted on the track at selected locations. The extensions are mounted on the side of the track in locations where the resilient belt will engage the extension to provide additional driving or braking force, thereby enhancing the ability of the system to rapidly start, stop and precisely position the robot.

A track mounted robot according to the invention includes a frame, a drive motor mounted on the frame, and at least one drive wheel coupled to the drive motor and mounted on the frame to engage the track and drive the robot when rotated. The robot further includes means for increasing the friction between the drive system and the track in selected locations along the track. In one variation, the robot includes a motor pulley coupled to the drive motor and a drive belt extending around the motor pulley and the drive wheel, the drive wheel and belt being configured such that the drive belt does not substantially engage the track as the robot travels along the track.

The drive wheel includes a belt groove extending circumferentially around the drive wheel such that the drive belt drives the drive wheel without substantial contact with the track. The robot also includes one or more shoes or brushes mounted on the frame, the shoe(s) being configured to contact an electrified rail positioned between opposed sides of the track to provide electric power to the robot. Preferably, the robot is provided with an onboard power supply such as a battery or, capacitor having electrical storage capacity sufficient to provide power to drive the robot along the track.

BRIEF DESCRIPTION OF THE DRAWINGS

FIG. 6 is a partial perspective view of an alternative drive system according to the invention;

FIG. 7 is a partial front view of the drive system of FIG. 6;

FIG. 12 is a partial front view of the drive system of FIG. 11.

DETAILED DESCRIPTION

Figure 1:
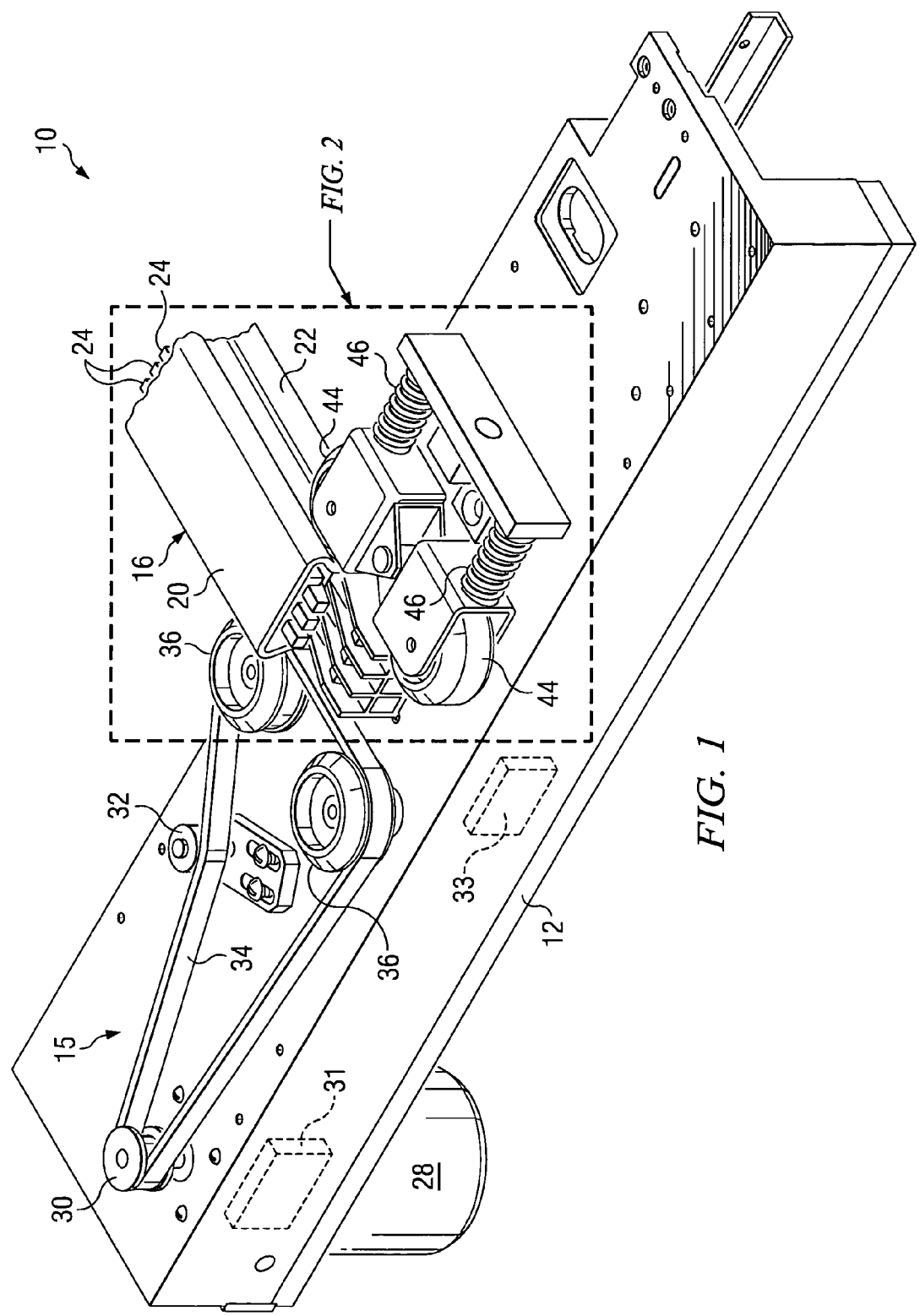
FIG. 1 is a partial perspective view of a drive system for a track mounted robot in accordance with one aspect of the invention.
Figure 2:
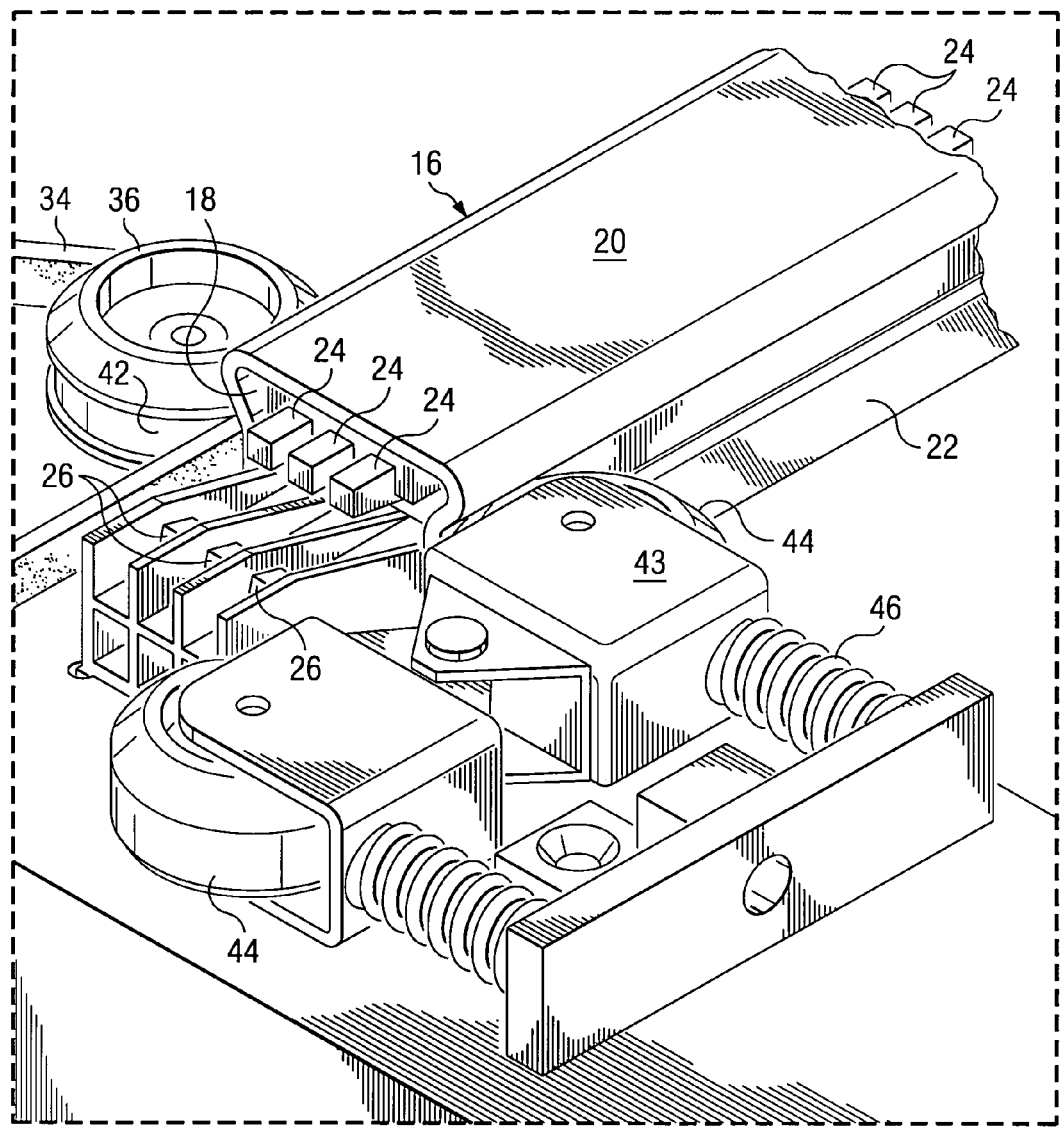
FIG. 2 is an enlarged view of the electrified rail and shoes of the system of FIG. 1.
Figure 3:
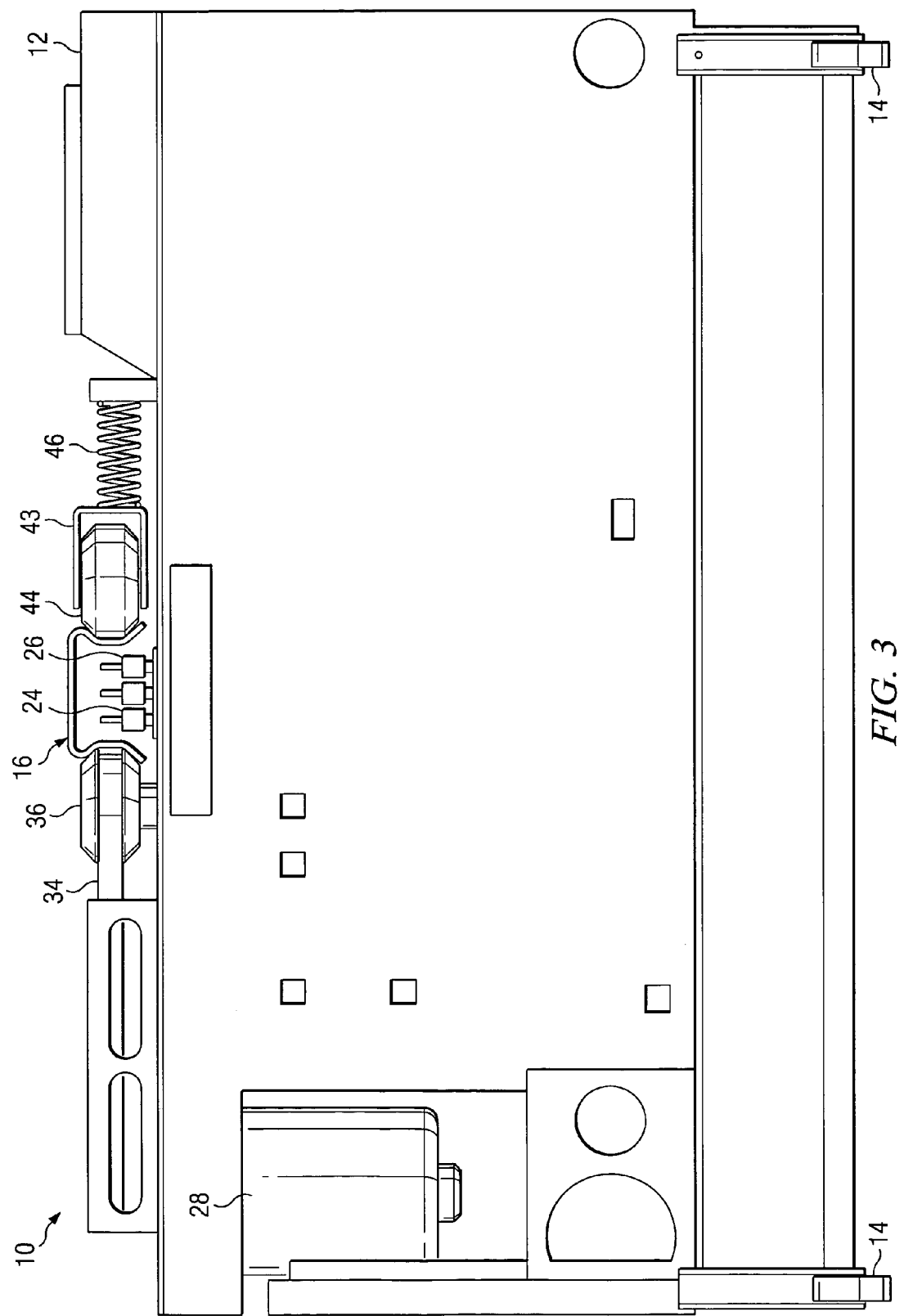
FIG. 3 is a partial side view of a robot equipped with the system of FIG. 1.

Referring to FIGS. 1-4, a delivery robot 10 configured to receive and transport articles to one of a number of selected destinations includes a frame 12 and a plurality of guide wheels 14 along the lower edge of frame 12 for supporting the robot on a shelf or similar structure (not shown) positioned below the robot as the robot travels along a track 16. Track 16 includes a flat top wall 20 and a pair of trough shaped sidewalls 22 that form a downwardly opening channel 18. One or more electrified rails 24 mounted on the inside surface of top wall 20 extend downwardly into channel 18 to provide power to robot 10. As shown, robot 10 is equipped with a plurality of shoes or brushes 26, each configured to contact an electrified rail 24 to provide power to robot 10.

Figure 4:
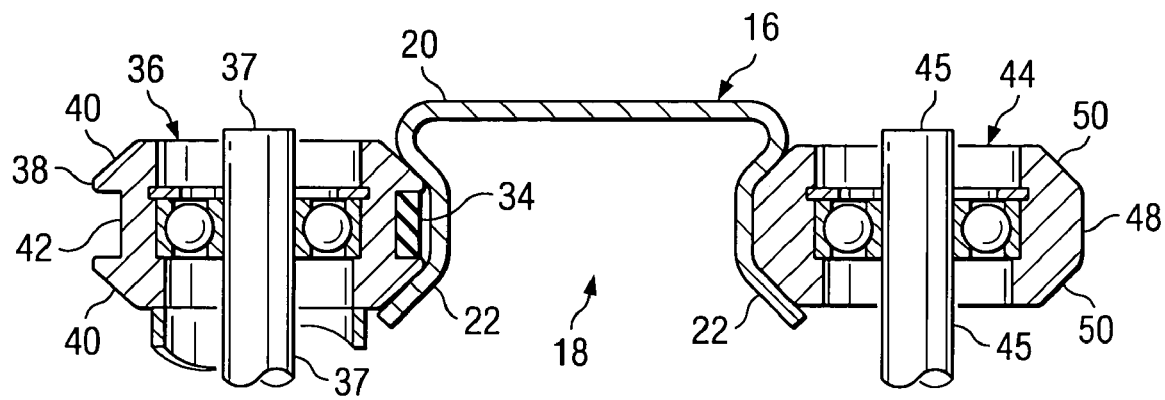
FIGS. 4 and 5 are partial cross-sections of the track, drive wheels and idler wheels of the system of FIG. 1.

Robot 10 is equipped with a drive unit 15 which includes an electric motor 28 mounted on frame 12 with a motor pulley 30, a drive belt 34 that extends around motor pulley 30 and a pair of drive wheels 36 that engage track 16 to drive robot 10 when motor 28 is actuated. Belt 34 is preferably formed from a resilient, relatively soft material such as a synthetic rubber so that at least the outside surface of the belt has a high coefficient of friction. An adjustable idler pulley 32 provides means for setting and adjusting the tension on belt 34. As best illustrated in FIG. 4, each of drive wheels 36 are mounted on an axle 37 and formed with a face 38 and relieved (sloped) corners or shoulders 40 such that face 38 substantially matches the profile of trough-shaped sidewall 22 of track 16. A belt groove 42 formed in face 38 is sufficiently recessed to allow belt 34 to drive wheels 36 with little or no contact between belt 34 and track 16 during normal operations.

In order to maintain drive wheels 36 firmly in contact with track 16, a pair of idler wheels 44 mounted on frame 12 are positioned to contact sidewall 22 of track 16 opposite drive wheels 36. Idler wheels 44, similar to drive wheels 36, are each formed with a circumferential face 48 and shoulders 50 that are configured to match the right-hand profile of trough-shaped sidewall 22 of track 16. Each of idler wheels 44 is mounted on an axle 45 which in turn is mounted in a C-shaped bracket 43. As illustrated, a pair of springs 46 are held in compression against bracket 43 to bias idler wheels 44 against track 16 with sufficient force to hold drive wheels 36 firmly in contact with track 16.

Motor 28 is preferably a variable speed, DC motor equipped with an encoder that registers the revolutions turned by the motor and transmits a signal to an onboard microprocessor 31 which uses the encoder signal to measure movement of the robot 10 along track 16. Microprocessor 31 controls the operation of robot 10, including motor 28 which is powered directly from electrified rails 24 or from an onboard rechargeable storage device 33 such as a battery or a high power capacitor commonly known as an ultra capacitor. Capacitive power supplies are disclosed in U.S. Pat. No. 5,528,121 issued Jun. 18, 1996 and U.S. Pat. No. 5,532,572 issued Jul. 2, 1996 for a "Storage Capacitor Power Supply," U.S. Pat. No. 5,604,426 issued Feb. 18, 1997 for an "Electric Apparatus with a Power Supply Including an Electric Double Layer Capacitor" and U.S. Pat. No. 5,783,928 issued Jul. 21, 1998 for a "Storage Capacitor Power Supply" the contents of which are incorporated herein by reference.

In many applications, it is desirable to minimize the length and number of electrified rails 24 required to operate the system. Thus, in a preferred embodiment, the onboard rechargeable storage device 33 is charged as robot 10 travels along selected, relatively short segments of the total length of track 16 that are equipped with a length of electrified rail 24. Ideally, the onboard rechargeable storage device 33 has sufficient capacity to enable robot 10 to complete a delivery cycle without recharging, thereby reducing the length of electrified rail 24 required to operate the system.

Figure 5:
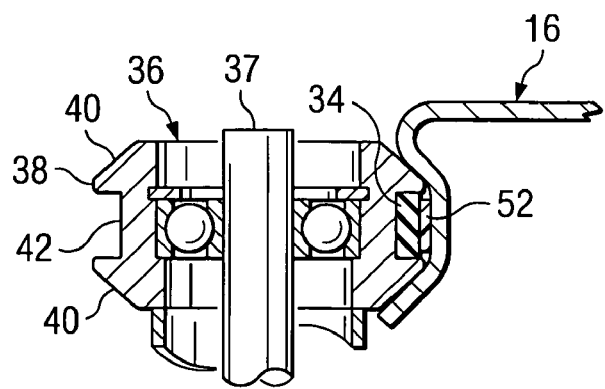

During operation, robot 10 is required to accelerate and decelerate quickly at various locations along track 16. For example, robot 10 is required to stop rapidly and precisely to deliver objects or articles at a selected destination. Robot 10 may also be required to accelerate to move rapidly along long stretches where track 16 in order to reduce cycle time. Turning to FIG. 5, in order to enhance the capability of robot 10 to rapidly accelerate or decelerate at selected locations along track 16, track extensions 52 are mounted on track 16 at such locations. As illustrated, track extension 52 comprises a shim-like strip mounted in the trough portion of sidewall 22 of track 16.

Extensions 52 may be constructed from a suitable plastic, metal or a synthetic rubber. When robot 10 travels though a section of track 16 where an extension 52 has been installed, belt 34 contacts the extension, creating additional frictional force between track 16 and drive unit 15. The additional frictional force enhances the capability of robot 10 to accelerate or decelerate quickly in selected areas of track 16 where extensions 52 have been installed. Preferably, extensions 52 are provided with ends that taper in a width wise direction to facilitate engagement of belt 34 with the extension. Preferably, the thickness of extension 52 is selected to provide sufficient contact between belt 34 and extension 52 such that belt 34 and wheels 36 simultaneously contact track 16 to drive robot 10.

The use of extensions 52 in combination with drive unit 15 provides a number of advantages. Since belt 34 is formed from a resilient, relatively soft material, continuous contact with track 16 would result in excessive wear of the belt. Thus, the use of extensions 52 only where additional friction between drive unit 15 and track 16 is required to enhance the ability of robot 10 to accelerate and decelerate rapidly increases the useable life of belt 34 while simultaneously enhancing the travel capability of robot 10. This is particularly advantageous in applications where robot 10 is heavy, in which case a substantial amount of force is required to abruptly change the velocity of the robot or negotiate a curved section of track. Further, since belt 34 is formed from a relatively soft material, noise levels are significantly reduced during operation.

Figure 8:
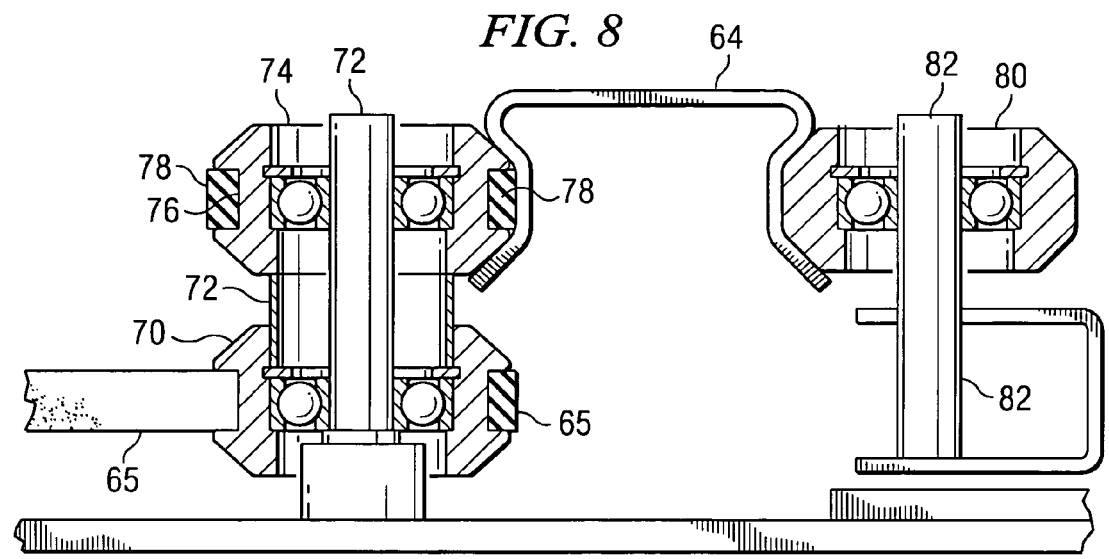
FIG. 8 is a partial cross-section of the drive system of FIG. 6.

Referring now to FIGS. 6-8, in another embodiment, robot 60 employs a modified drive unit 62 configured to provide additional clearance between the robot and a track 64. As shown, track 64 is substantially identical to track 16 of FIGS. 1-4. Modified drive unit 62 includes an electric motor 66, motor pulley 68 and a first drive belt 65 that extends around motor pulley 68 to drive a pair of intermediate pulleys 70 mounted on axles 72. As shown, a pair of drive wheels 74 mounted on the upper ends of axles 72 are positioned to engage track 64 to drive robot 60. A second, resilient drive belt 78, formed from a relatively soft material extends around drive wheels 74 engaging a belt groove 76 in each of drive wheels 74. Drive wheels 74 and drive belt 78 function in substantially the same manner as described in connection with drive belt 34 and drive wheels 36 described above. In particular, resilient drive belt 78 engages extensions 52 in the same manner as drive belt 34. Likewise, a pair of idler wheels 80, mounted on axles 82 are biased against track 64 with springs 84 to function in the same manner as idler wheels 44, described above, to hold drive wheels 74 and/or belt 78 in contact with track 64.

Figure 9:
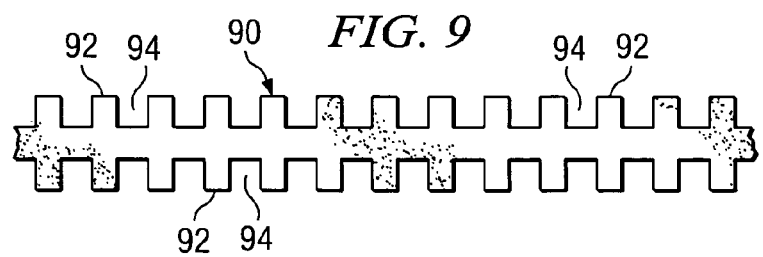
FIG. 9 is a schematic representation of a timing belt utilized in the system of the invention.
Figure 10:
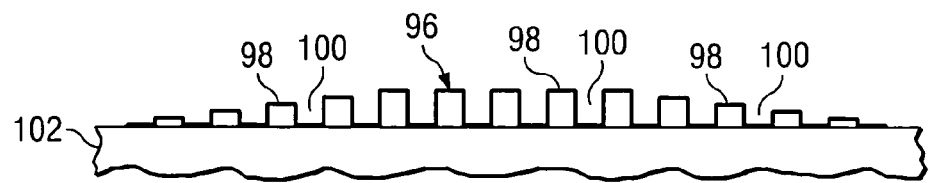
FIG. 10 is a partial side view of a track and extension according to the invention.

Referring now to FIGS. 9 and 10, a double-sided timing belt 90 having a plurality of teeth or ridges 92 separated by grooves 94 may be substituted for belt 34 or belt 78. In this embodiment, a rack-shaped shim or extension 96 having a plurality of teeth and grooves 98 and 100, respectively, is substituted for extension 52. Similar to belts 34 and 78, double sided timing belt 90 is formed from a resilient, relatively soft material in order to minimize noise during operation and to aid in indexing teeth 92 to the corresponding grooves 100 of extension 96. To further aid in indexing double-sided timing belt 90 to extension 96, the length of teeth 98 of extension 96 is progressively reduced adjacent the ends of the extension. The combination of double-sided timing belt 90 and track extension 96 functions in substantially the same manner as belt 34 and extension 52 to aid in accelerating and positioning robot 10. Thus, as in the case of extension 52, extensions 96 are mounted on track 102 at locations where robot 10 may be required to accelerate or decelerate rapidly and/or where precise positioning of robot 10 is required.

Figure 11:
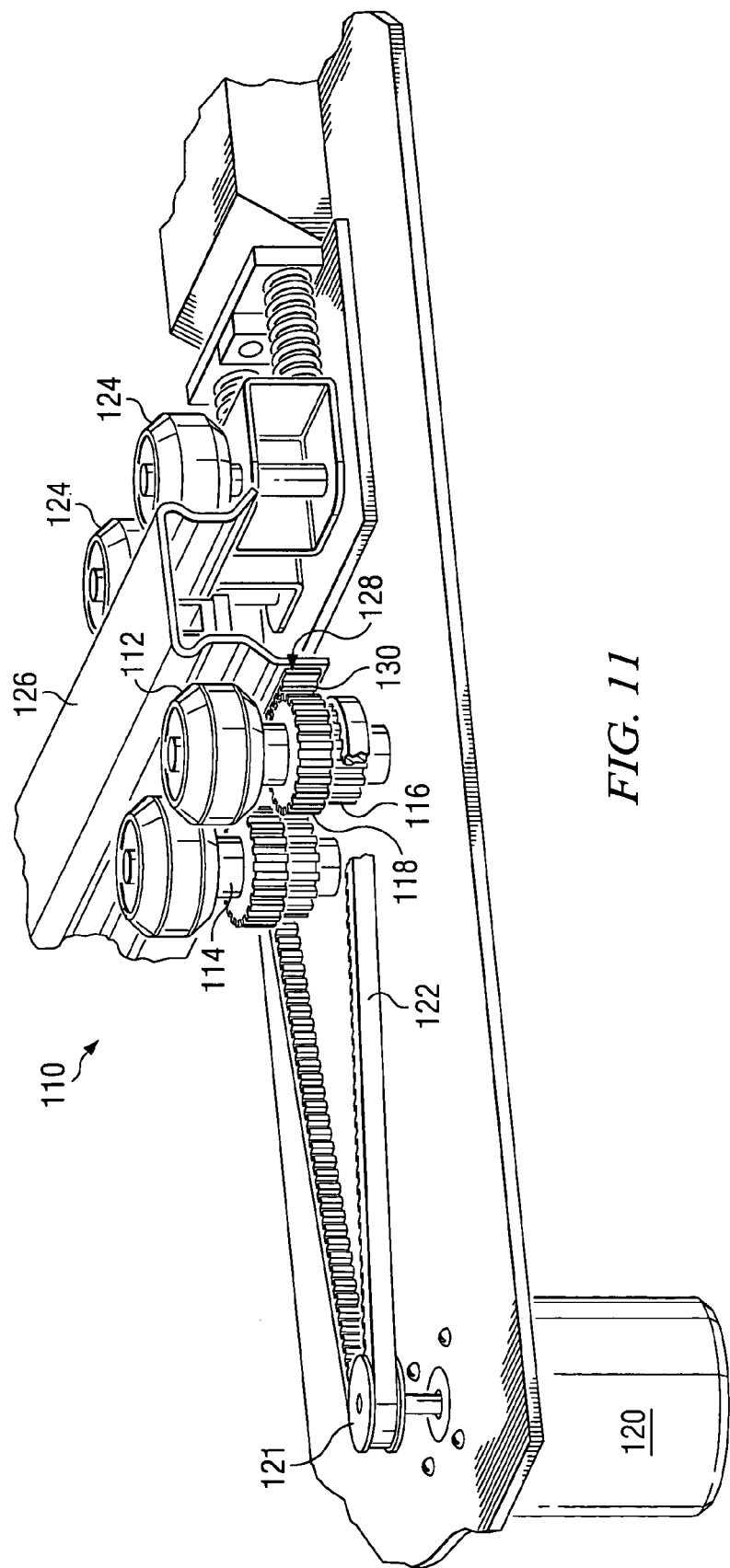
FIG. 11 is a perspective view of another alternative drive system according to the invention.

Turning to FIGS. 11 and 12, in yet another embodiment, a drive unit 110 includes a pinion gear 118 configured to engage rack-like track extensions 128 at selected locations on track 126. As illustrated drive unit 110 includes one or more drive wheels 112 mounted on a shaft 114 along with a drive gear 116 and pinion gear 118. An electric motor 120 drives shaft 114, drive wheels 112 and pinion gear 118 with a timing belt 122 that passes around motor pulley 121 and drive gear 116. One or more opposed idler wheels 124 are biased against track 126 to hold drive wheels 112 in contact with the rail. As illustrated, pinion gear 118 is mounted on shaft 114 above drive gear 116 and configured to engage the teeth 130 of rack-like track extensions 128 mounted on track 126 in those areas where robot 10 is required to rapidly accelerate and decelerate. In order to facilitate indexing of pinion gear 118 with teeth 130 of extension 128, the length of teeth 130 may be progressively reduced adjacent the ends of the extension in the manner illustrated in FIG. 10.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. Thus, while the invention has been described in connection with an automated delivery robot, the drive system described herein may be used in connection with a variety of track mounted trolleys. All such variations and additions are specifically contemplated to be with the scope of the invention. It is, therefore, intended that the appended claims encompass any such modifications or embodiments.

The invention claimed is:

1. A drive system for a track mounted robot, comprising:
   a drive motor mounted on the robot;
   a drive pulley coupled to the drive motor;
   at least one drive wheel driven by the drive pulley positioned to engage the track when rotated to drive the robot; and
   a drive belt extending around the drive pulley and an outwardly opening belt groove extending circumferentially around the drive wheel to rotate the drive wheel against the track when driven by the motor, the drive wheel and drive belt being configured such that the drive belt does not substantially engage the track as the robot travels along the track, and
   one or more extensions mounted on the track at selected locations, each extension being positioned so that the resilient belt engages the extension, increasing the frictional force between the drive unit and the track.

2. The drive system of claim 1 wherein the drive belt extends through the belt groove to drive the drive wheel without substantial contact with the track other than at the extensions.

3. The drive system of claim 2 wherein the ends of the extension are tapered to facilitate engagement of the drive belt with the extension.

4. The drive system of claim 1 wherein the ends of the extension are tapered in thickness to facilitate engagement of the drive belt with the extension.

5. The drive system of claim 1 further comprising an idler mounted on the robot, the idler contacting the side of the track opposite the drive wheel, the idler being biased against the track to maintain contact between the drive wheel and the track.

6. A drive system for a track mounted robot, comprising;
   a drive motor mounted on the robot;
   a drive pulley coupled to the drive motor;
   at least one drive wheel driven by the drive pulley positioned to engage the track when rotated to drive the robot; and
   a drive belt extending around the drive pulley and an outwardly opening belt groove extending circumferentially around the drive wheel to rotate the drive wheel against the track when driven by the motor, the drive wheel and drive belt being configured such that the drive belt does not substantially engage the track as the robot travels along the track, and an idler mounted on the robot, the idler contacting the side of the track opposite the drive wheel, the idler being biased against the track to maintain contact between the drive wheel and the track.

7. The drive system of claim 6 wherein the drive wheel and idler are mounted on a horizontal upper surface of the robot.

8. A drive system for a track mounted robot, comprising:
   a drive motor mounted on the robot;
   a drive pulley coupled to the drive motor;
   at least one drive wheel driven by the drive pulley positioned to engage the track when rotated to drive the robot; and
   a drive belt extending around the drive pulley and an outwardly opening belt groove extending circumferentially around the drive wheel to rotate the drive wheel against the track when driven by the motor, the drive wheel and drive belt being configured such that the drive belt does not substantially engage the track as the robot travels along the track, and a shoe for contacting an electrified rail mounted between opposing sides of the track to provide power to the drive motor.

9. A track mounted robot, comprising:
   a frame;
   a drive system including a drive motor mounted on the frame and at least one drive wheel the drive wheel being coupled to the drive motor and positioned to engage the track when rotated to drive the robot; and
   means for increasing the friction between the drive system and the track in selected locations along the track, and
   a motor pulley coupled to the drive motor and a drive belt extending around the motor pulley and the drive wheel, the drive belt rotating the drive wheel against the track when driven by the motor, the drive wheel and belt being configured such that the drive belt does not substantially engage the track as the robot travels along the track.

10. The robot of claim 9 wherein the drive wheel includes a belt groove extending circumferentially around the drive wheel such that the drive belt engages the belt groove to drive the drive wheel without substantial contact with the track.

11. The robot of claim 9 further comprising an idler wheel mounted on the frame such that the idler wheel contacts the side of the track opposite the drive wheel, the idler being spring biased against the track to maintain contact between the drive wheel and the track.

12. The robot of claim 11 wherein the drive wheel and idler are mounted on a horizontal upper surface of the frame.

* * * * *